(12) United States Patent
Coleman et al.

(10) Patent No.: US 6,402,580 B1
(45) Date of Patent: Jun. 11, 2002

(54) NEARLY HEADLESS NICK NOISEMAKER CANDY TOY

(76) Inventors: Thomas J. Coleman, 19170 Paddock Pl., Abingdon, VA (US) 24211; William K. Schlotter, IV, 117 Wateridge La., Fredericksburg, VA (US) 22406; Princess Ann Coleman, 19170 Paddock Pl., Abingdon, VA (US) 24211; Ann M. Schlotter, 117 Wateridge La., Fredericksburg, VA (US) 22406

( * ) Notice: Subject to any disclaimer, the term of this patent is extended or adjusted under 35 U.S.C. 154(b) by 0 days.

(21) Appl. No.: 09/832,850

(22) Filed: Apr. 11, 2001

(51) Int. Cl.$^7$ .............................. A63H 3/00; A23G 1/00
(52) U.S. Cl. .............................. 446/72; 446/71; 446/73; 446/81; 426/104; 426/134
(58) Field of Search .............................. 446/71–73, 76, 446/81, 297, 404, 418, 420; 426/104, 134

(56) References Cited

U.S. PATENT DOCUMENTS

| | | | |
|---|---|---|---|
| 5,391,107 A | * 2/1995 | Coleman | 426/134 |
| 5,536,054 A | * 7/1996 | Liaw | 294/1.1 |
| 5,690,535 A | * 11/1997 | Coleman et al. | 426/104 |
| 5,820,437 A | * 10/1998 | Coleman et al. | 446/196 |
| 5,855,500 A | * 1/1999 | Coleman et al. | 446/404 |
| 5,921,841 A | * 7/1999 | Coleman et al. | 426/104 |
| 6,183,336 B1 | * 2/2001 | Coleman et al. | 426/104 |

* cited by examiner

*Primary Examiner*—Jacob K. Ackun
*Assistant Examiner*—Bena B. Miller
(74) *Attorney, Agent, or Firm*—Melvin L. Crane, Agent

(57) ABSTRACT

A candy holding device designed to add amusement to a child's candy. The device comprises a main housing which can be in the form of a full or partial body or skeleton or any form desired, hard plastic balls, a male pivot point, a female pivot slot, an anchor pin, a hollow noisemaker, an expandable stick holder, a slide groove, a candy stick and a candy. The upper portion of the main housing has a hollow noisemaker with a slide groove. The candy and candy stick are held stationary by the expandable stick holder which attaches to the top of the male pivot point and secured by the anchor pin. The main housing has extensions which hold the hard plastic balls on each side of the hollow noisemaker. By holding the main housing and shaking from side to side, sounds are produced by bouncing the hollow noisemaker against the hard plastic balls via the male pivot point. The slide groove serves two functions, one to allow the sound to travel out of the top of the noisemaker and the other is to allow the head to move from side to side while the candy remains stationary. Another version is to have the hollow noisemaker and the candy and candy stick holder move as one unit from side to side against the hard plastic balls via the male pivot point to produce sounds. The hollow noisemaker has an aperture to allow the sounds to travel outward. The candy can be replaceable or molded onto a nipple.

7 Claims, 6 Drawing Sheets

NEARLY HEADLESS NICK NOISEMAKER CANDY TOY

BACKGROUND OF THE INVENTION

Heretofore a prior art noisemaker candy holder has been taught in U.S. Pat. No. 5,855,500 in which the device has a mechanical noisemaker including movable arms that are spring loaded and which strike a surface to make noise.

OBJECTS OF THE INVENTION

It is therefore an object of the present invention to provide a noisemaker which has spaced ball-type hammers that are contacted by a movable part by which a noise is made. The movable part moves from side to side between the ball hammers which strike the ball hammers so that a noise is made by a contact of the noisemaker with the ball hammers.

Another object is to provide a candy holder in combination with the movable noisemaker by which a piece of candy can be held in place for consumption by a person.

Another object is to provide a candy holder with a movable noisemaker on one end and an optional removable noisemaker and candy reservoir on the opposite end with candy.

Other objects and advantages will become obvious to those skilled in the art upon a review of the drawings, specification and claims.

DETAILED DESCRIPTION

Figure 1:
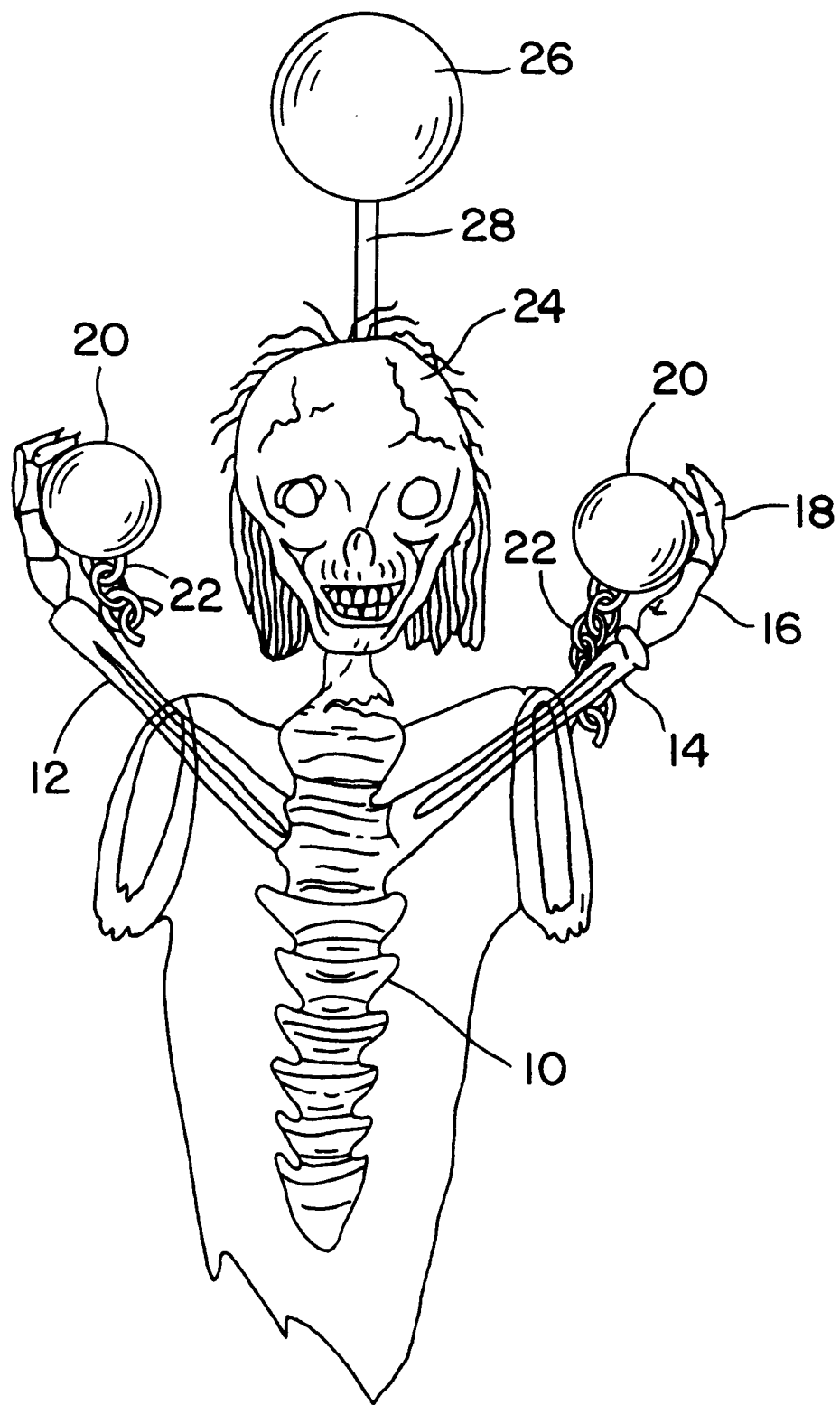
FIG. 1 illustrates a front view of the device.

Now referring to the drawings wherein the same reference characters represent the same parts throughout the different views, FIG. 1 sets forth a front view of the device which is in the form of a dressed skeleton. As shown, the device illustrates a main housing 10 with outward extended fixed arms 12, 14 which are provided with hand-like forms 16 including fingers 18 that are holding plastic, metal or any other suitable balls 20 which include attached chains or rope 22. The device could have any suitable form of a person, animal, or any real or unreal device having the same operative parts including appendages such as set forth below. A hollow plastic head 24 which has the appearance of a face is attached to the main housing and a candy pop 26 is secured directly to the head or by a holder 28 held in a suitable candy stick holder, not shown. The eyes, nose and mouth can form holes through which a sound made by the head can reach the outside to form a noise.

Figures 2, 2A:
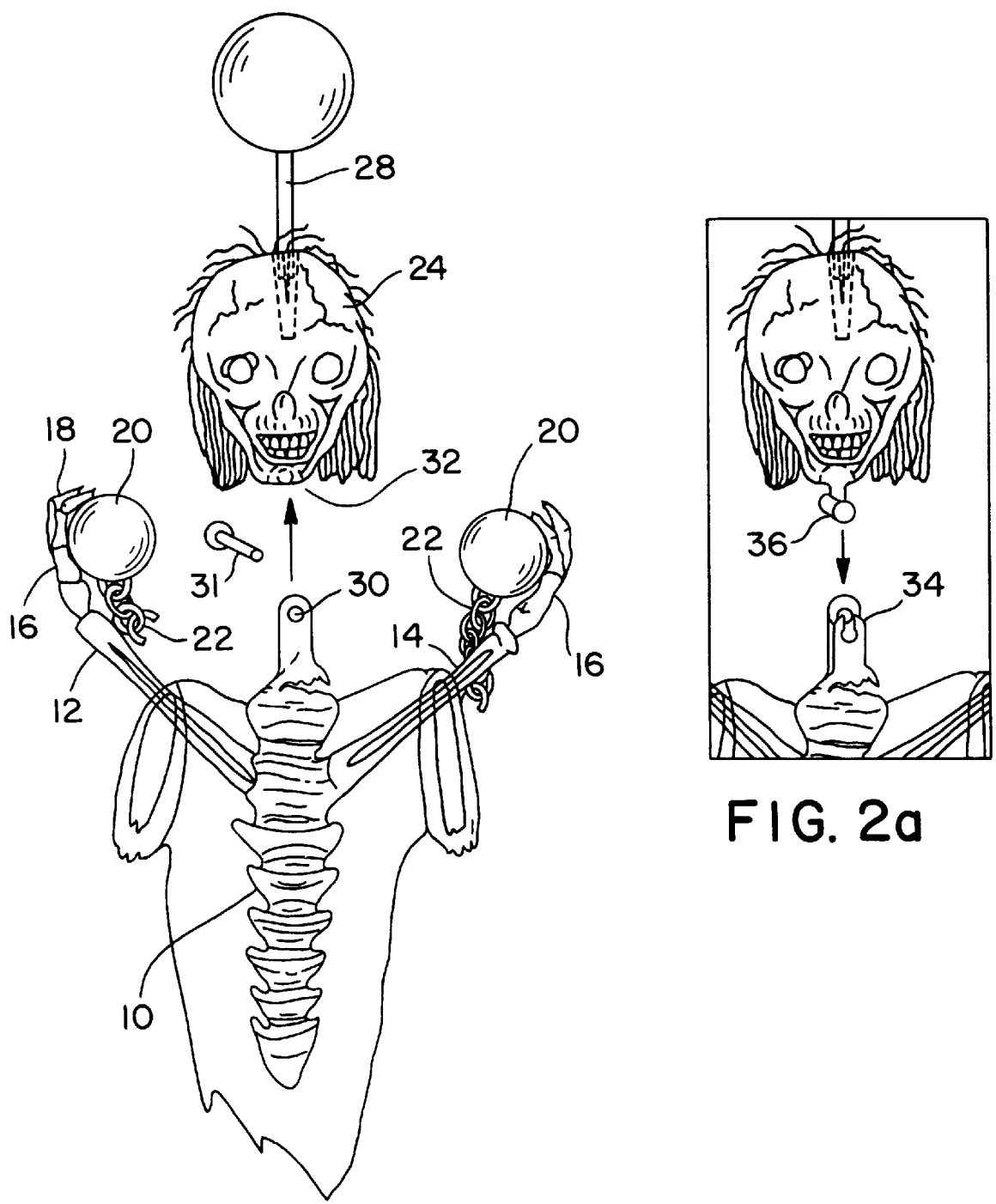
FIG. 2 illustrates a front view with spaced parts.
FIG. 2a illustrates a cut away view of a modification of the device illustrating a different connecting means.

FIG. 2 is a somewhat exploded view which illustrates the head spaced from a pivot pin holder 30 with an anchor pin 31 which secures the head to the pivot pin holder. The head can pivot on the anchor pin from side to side between the balls 20. As the head moves to the left and right, the head strikes the balls and as the head strikes the balls on each side, a noise is made. The head is provided with an aperture 32 through which the anchor pin extends so the head moves from side to side.

FIG. 2a is a cut away view which illustrates a modification of the device for a different connecting means using a female pivot point 34 and a male pivot point 36. The male pivot point 36 located on the head 24 can be snapped into the female pivot point 34 securing the head 24 to the main housing 10 allowing the head to move from side to side striking the balls.

Figure 3:
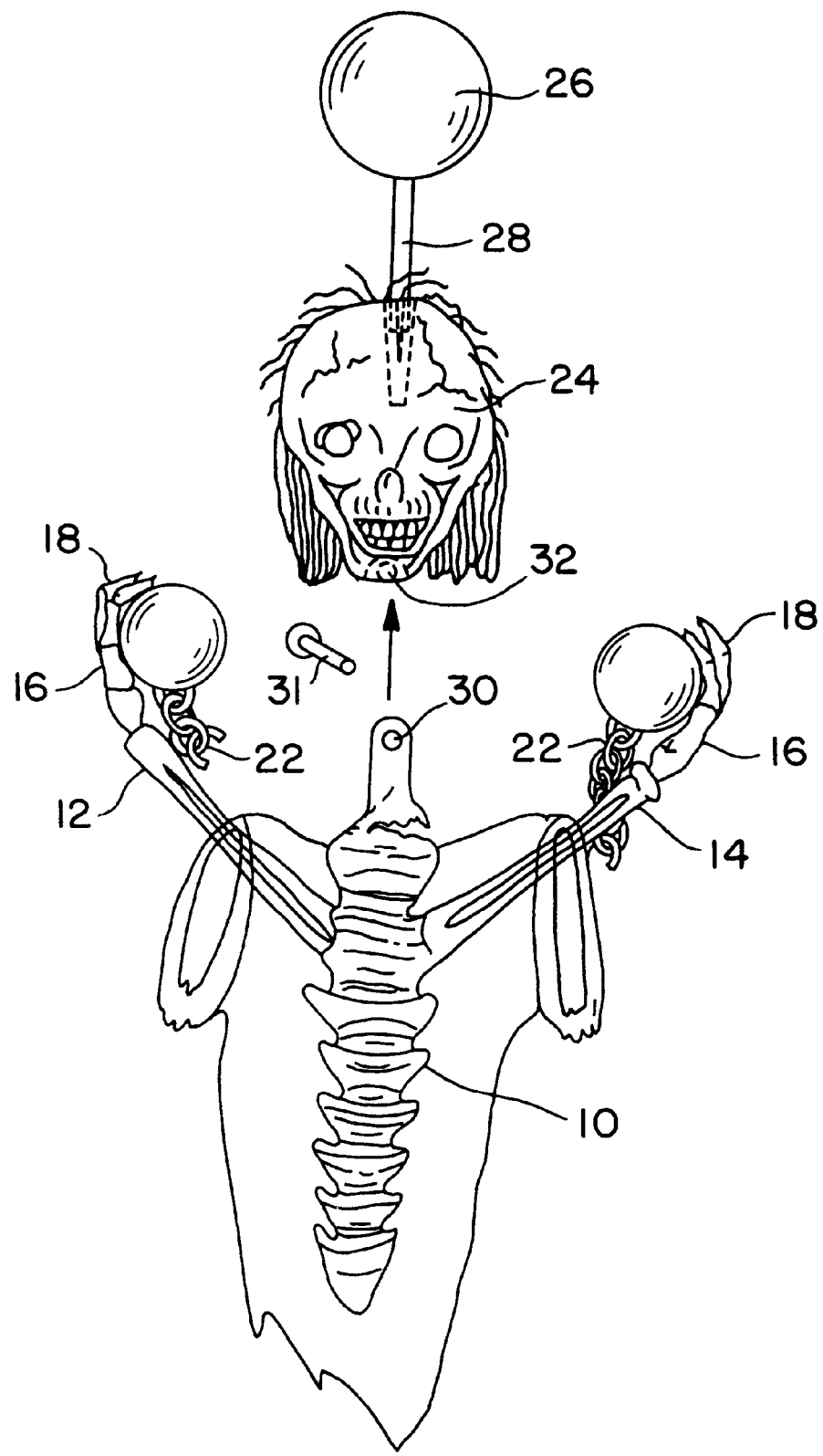
FIG. 3 illustrates a front view with spaced parts with parts shown by dotted lines.

FIG. 3 is a front view such as shown in FIG. 2 except the candy holder is shown in dotted lines fixed in the head.

Figure 4:
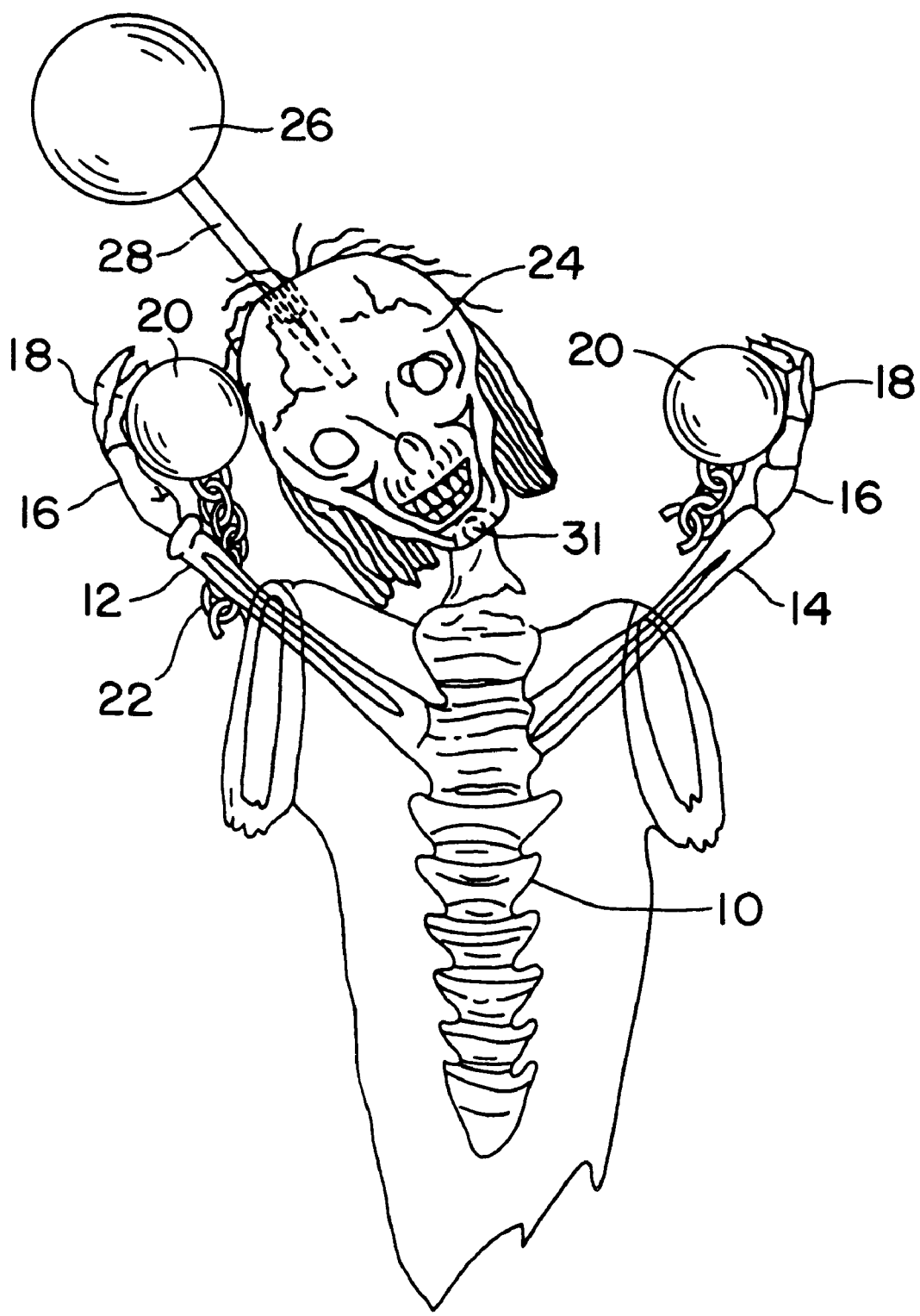
FIG. 4 illustrates a front view with the candy holder fixed to the noisemaker part.

FIG. 4 illustrates the head moved to the left such that the noisemaker head strikes the ball 20. As the body is shaken in an opposite direction, the noisemaker head will strike the ball on the right side.

Figure 5:
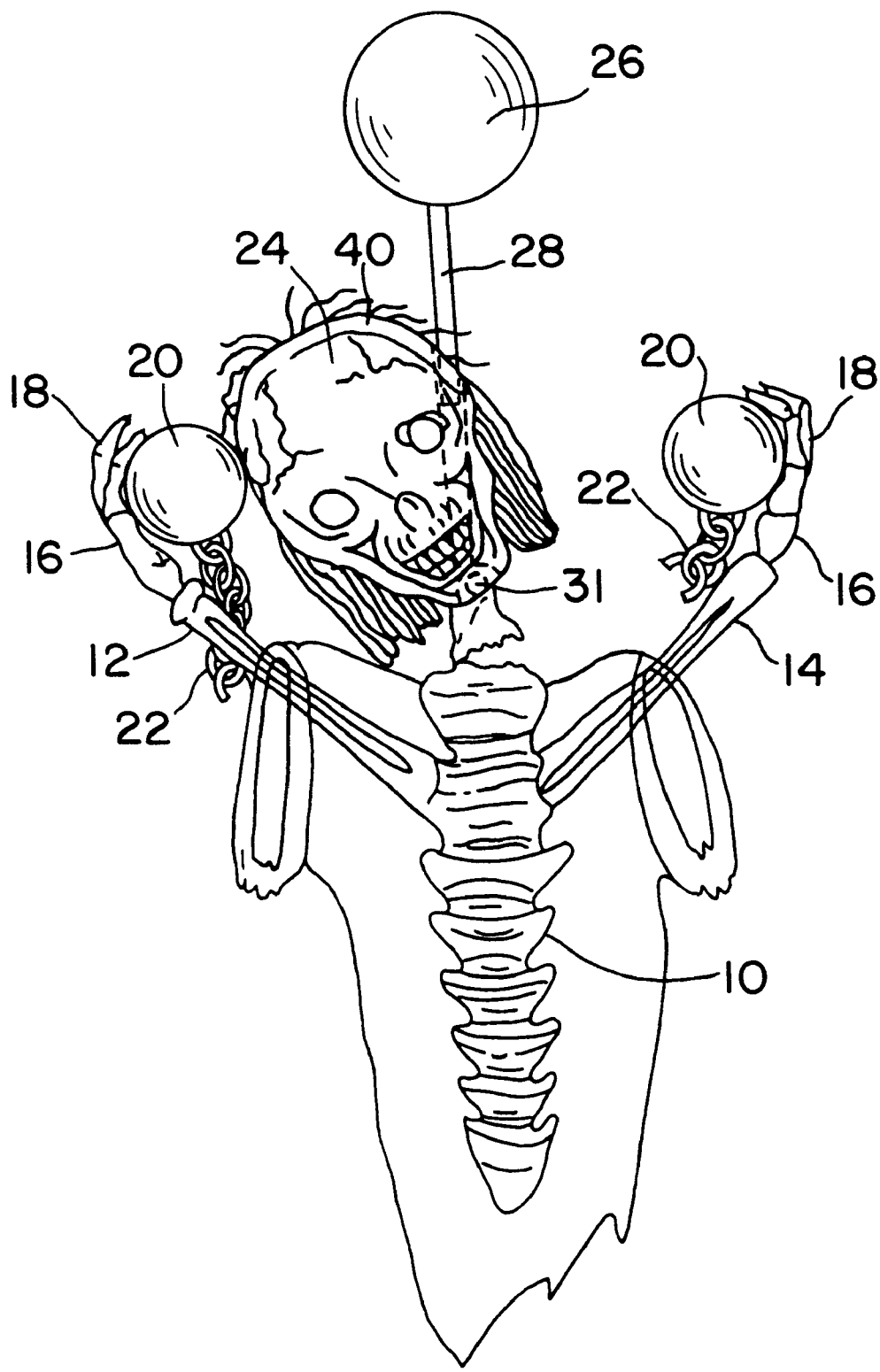
FIG. 5 illustrates a front view of a modification of the device in which the candy holder is stationary with respect to a movable noisemaker.

FIG. 5 is a modification of the device in which a slot 40 is formed across the top of the head and the candy stick holder is fixed to the main housing so that the candy stick holder remains stationary as the head moves from side to side. Thus, the candy pop remains fixed with respect to the body part as the head moves from side to side.

Figure 6:
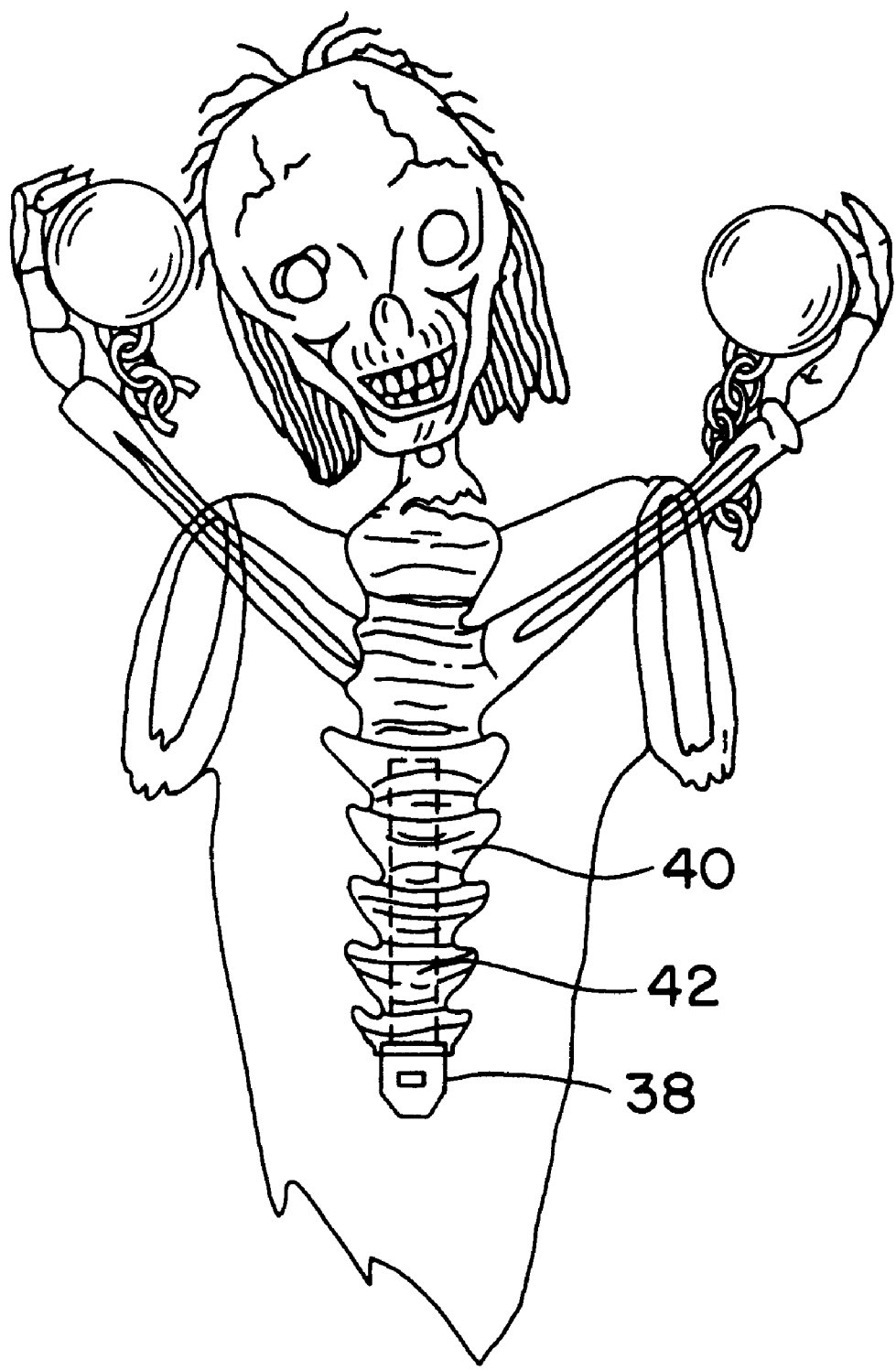
FIG. 6 illustrates a front view of a modification of the device in which a candy reservoir is located in the main housing with a removable noisemaker device with candy.

FIG. 6 is a modification of the device in which a candy reservoir 40 with candy 42 is located in the main housing 10 and has a removable noisemaker device 38.

Once the device has been assembled so that the head pivots on the main housing, a noise is made by movement of the body so that the head moves from side to side. The device has been shown in the form of a skeleton; however, it would be obvious that the device could be made in any likeness so long as the balls are spaced from each other on opposite sides of the noisemaker such that the noisemaker moves from side to side to strike the balls.

The foregoing relates to preferred exemplary embodiments of the invention, it being understood that other variants and embodiments thereof are possible within the spirit and scope of the invention, the later being defined by the appended claims.

We claim:

1. A candy holding noisemaker device which comprises a main housing, a noisemaker which pivots along a line relative to said main housing, spaced appendages which extend from said main housing in alignment with and to opposite sides of said noisemaker, balls/parts secured to outer ends of said spaced appendages in a position to be struck by said noisemaker during movement of said noisemaker from side to side toward said balls/parts and a piece of candy secured to the said noisemaker or said main housing.

2. A device as set forth in claim 1, in which said piece of candy is fixed with respect to said noisemaker.

3. A device as set forth in claim 1, in which said noisemaker has a slot in it's upper top portion and a piece of candy is fixed to said main housing or said noisemaker as said noisemaker moves from side to side.

4. A device as set forth in claim 1, in which said main housing and said noisemaker are in the form of at least a portion of a character.

5. A device as set forth in claim 2, in which said main housing and said noisemaker are in the form of at least a portion of a character.

6. A device as set forth in claim 3, in which said main housing and said noisemaker are in the form of at least a portion of a character.

7. A device as set forth in claim 1, in which said noisemaker is attached to an upper end of said main housing and another noisemaker and candy reservoir with candy is attached to a lower end of said main housing.

* * * * *

UNITED STATES PATENT AND TRADEMARK OFFICE
CERTIFICATE OF CORRECTION

PATENT NO.    : 6,402,580 B1
DATED         : June 11, 2002
INVENTOR(S)   : Thomas J. Coleman et al.

It is certified that error appears in the above-identified patent and that said Letters Patent is hereby corrected as shown below:

<u>Title page, Item [54] and Column 1, lines 1-2,</u>
Correct the title to read:
-- CANDY CLACKER NOISEMAKER CANDY TOY --

Signed and Sealed this

Twelfth Day of November, 2002

Attest:

Attesting Officer

JAMES E. ROGAN
*Director of the United States Patent and Trademark Office*